United States Patent
Yan

(10) Patent No.: US 9,595,994 B2
(45) Date of Patent: Mar. 14, 2017

(54) MODE-BASED ANTENNA TUNING

(71) Applicant: QUALCOMM Incorporated, San Diego, CA (US)

(72) Inventor: Hongbo Yan, Vista, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 80 days.

(21) Appl. No.: 14/177,029

(22) Filed: Feb. 10, 2014

(65) Prior Publication Data
US 2015/0229348 A1    Aug. 13, 2015

(51) Int. Cl.
| H04B 7/005 | (2006.01) |
| H04B 1/56 | (2006.01) |
| H04B 1/44 | (2006.01) |
| H04L 5/14 | (2006.01) |
| H04B 1/403 | (2015.01) |
| H04W 88/06 | (2009.01) |
| H04B 1/04 | (2006.01) |
| H04B 1/18 | (2006.01) |
| H04B 1/50 | (2006.01) |

(52) U.S. Cl.
CPC .............. *H04B 1/56* (2013.01); *H04B 1/406* (2013.01); *H04B 1/44* (2013.01); *H04L 5/14* (2013.01); *H04B 1/0458* (2013.01); *H04B 1/18* (2013.01); *H04B 1/50* (2013.01); *H04W 88/06* (2013.01)

(58) Field of Classification Search
CPC .................................. H04B 1/56; H04B 1/44
USPC .................................................. 370/278–310
See application file for complete search history.

(56) References Cited

U.S. PATENT DOCUMENTS

| 8,391,804 B2 | 3/2013 | Duron et al. |
| 2008/0274706 A1* | 11/2008 | Blin ................. H04B 1/0458 455/84 |
| 2009/0121963 A1 | 5/2009 | Greene |
| 2010/0105425 A1 | 4/2010 | Asokan |
| 2012/0112852 A1 | 5/2012 | Manssen et al. |
| 2012/0243447 A1 | 9/2012 | Weissman et al. |
| 2012/0295554 A1 | 11/2012 | Greene et al. |
| 2013/0069737 A1 | 3/2013 | See et al. |
| 2014/0066067 A1* | 3/2014 | Karri .............. H04W 36/0022 455/436 |
| 2014/0119244 A1* | 5/2014 | Steer ..................... H04B 1/525 370/278 |

(Continued)

FOREIGN PATENT DOCUMENTS

EP    2073394 A1    6/2009

OTHER PUBLICATIONS

Partial International Search Report—PCT/US2015/014386—ISA/EPO—Apr. 20, 2015.

(Continued)

*Primary Examiner* — Iqbal Zaidi
(74) *Attorney, Agent, or Firm* — Arent Fox LLP

(57) ABSTRACT

Exemplary embodiments are related to antenna tuners. A device may include a transceiver configured to operate in a frequency division duplex (FDD) network. The device may also include an antenna tuner coupled to the transceiver. Further, the device includes a processor configured to tune the antenna tuner for a receive frequency if the device is operating in receive mode and tune the antenna tuner for a transmit frequency if the device is operating in a transmit and receive mode.

12 Claims, 8 Drawing Sheets

(56) References Cited

U.S. PATENT DOCUMENTS

2014/0378098 A1\* 12/2014 Trocke ................. H04W 12/08
 455/411

OTHER PUBLICATIONS

International Search Report and Written Opinion—PCT/US2015/014386—ISA/EPO—Aug. 18, 2015.
Second Written Opinion from International Application No. PCT/US2015/014386, mailed Jan. 11, 2016, 10 pages.

\* cited by examiner

MODE-BASED ANTENNA TUNING

BACKGROUND

Field

The present invention relates generally to wireless communication. More specifically, the present invention relates to embodiments for tuning an antenna tuner of a wireless communication device based on one or more operating conditions of the wireless communication device.

Background

A wireless communication device (e.g., a cellular phone or a smart phone) in a wireless communication system may transmit and receive data for two-way communication. The wireless communication device may include a transmitter for data transmission and a receiver for data reception. For data transmission, the transmitter may modulate a radio-frequency (RF) carrier signal with data to obtain a modulated signal, amplify the modulated signal to obtain an output RF signal having the proper output power level, and transmit the output RF signal via an antenna to a base station. For data reception, the receiver may obtain a received RF signal via the antenna and may condition and process the received RF signal to recover data sent by the base station.

The transmitter may include various circuits such as a power amplifier (PA), a filter, etc. The receiver may also include various circuits such as a low noise amplifier (LNA), a filter, etc. An antenna tuning (i.e. impedance matching circuit) may be coupled between the antenna and the transmitter and/or the receiver and may perform tuning (i.e. impedance matching) for the antenna, the power amplifier, or the LNA. The impedance matching circuit may have a large impact on the performance of the wireless device.

A need exists for tuning an antenna tuner of a wireless communication device based on one or more operating conditions of the wireless communication device. More specifically, a need exists for embodiments related to an antenna tuner that may be tuned based on a communication standard of the communication device, an operating mode of the communication device, or both.

DETAILED DESCRIPTION

Figure 1:
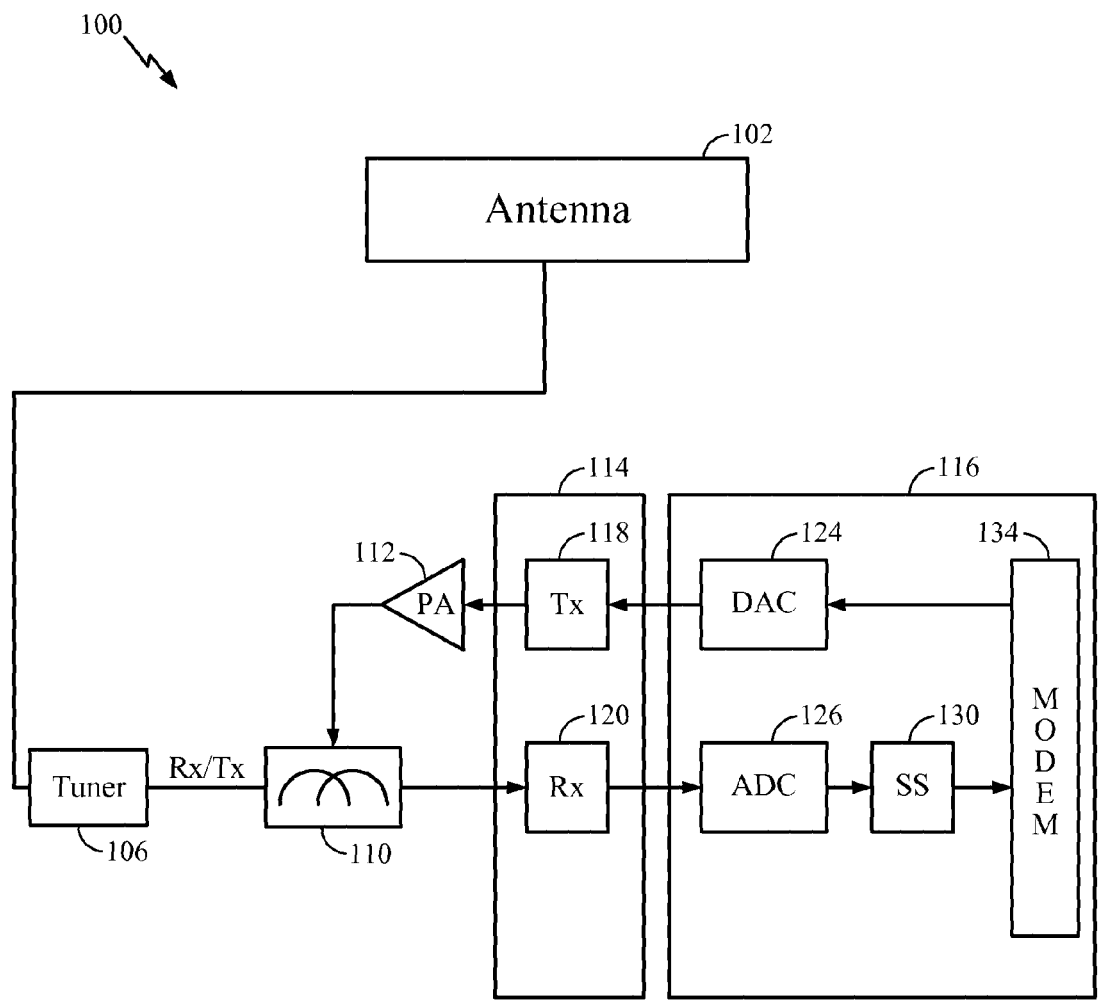
FIG. 1 depicts a device including an antenna tuner coupled to a transceiver including a transmitter and a receiver, in accordance with an exemplary embodiment of the present invention.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As will be appreciated by a person having ordinary skill in the art, an antenna tuner (i.e., an antenna matching circuit) of a conventional user equipment (e.g., a wireless communication device) may be tuned with respect to transmit frequency only. This may result undesirably result in up to 3 dB desense.

Exemplary embodiments, as described herein, are directed to devices including an antenna tuner. According to one exemplary embodiment, a device may include a transceiver configured to operate in a frequency division duplex (FDD) network. The device may further include an antenna tuner coupled to the transceiver. In addition, the device may include a processor configured to tune the antenna tuner for a receive frequency if the transceiver is operating in receive mode and tune the antenna tuner for a transmit frequency if the transceiver is operating in a transmit and receive mode.

According to another exemplary embodiment, the present invention includes methods for tuning an antenna tuner of a communication device. Various embodiments of such a method may include determining whether a device of a frequency division duplex (FDD) network is operating in a receive mode or a transmit and receive mode. The method may also include tuning an antenna tuner of the device for a receive frequency if the transceiver is operating in the receive mode. In addition, the method may include tuning the antenna tuner for a transmit frequency if the transceiver is operating in the transmit and receive mode.

Yet another embodiment of the present invention comprises a computer-readable media storage storing instructions that when executed by a processor cause the processor to perform instructions in accordance with one or more embodiments described herein.

Other aspects, as well as features and advantages of various aspects, of the present invention will become apparent to those of skill in the art through consideration of the ensuing description, the accompanying drawings and the appended claims.

According to one exemplary embodiment of the present invention, a device (e.g., a user equipment (UE) may include multiple radios including a first radio access technology (RAT) and a second RAT. By way of example only, one RAT may be a 1× (CDMA2000) communication standard and another RAT may be a long term evolution (LTE) communication standard. More specifically, a device may include a first RAT modem, which may comprise, for example, an LTE modem, and a second RAT modem, which may comprise, for example, a 1× (CDMA2000) modem. CDMA2000 includes but is not limited to single carrier radio transmission technology (1×RTT), 1× evolution-data optimized (1×EV-DO), and other like mobile technology standards that use CDMA channel access for sending voice, data, and signaling data between mobile phones and cell sites. As described herein CDMA2000 may be referred to as 1×. Although the following description is provided with respect to 1× and LTE for ease of illustration, other configurations of the first and second RAT modems are possible while remaining within the scope of the appended claims and the inventive aspects of the present disclosure.

FIG. 1 illustrates a device 100, in accordance with an exemplary embodiment of the present invention. Device 100 includes antenna 102, antenna tuner 106, a duplexer 110, and a power amplifier 112. Antenna tuner 106 may also be referred to herein as a "matching device" or, more specifically, a "matching circuit." Further, device 100 includes a module 114 and a module 116. By way of example, module 114 may include an analog module, a transceiver module, or a combination thereof. Further, as an example, module 116 may comprise a mobile data modem (MDM).

As illustrated in FIG. 1, module 114 includes a transmitter 118 and a receiver 120. Further, module 116 may include, for example only, a digital-to-analog converter (DAC) 124, an analog-to-digital converter (ADC) 126, a sample server 130, and a modem 134, which may comprise, for example, a 1× modem.

As depicted in FIG. 1, antenna 102 may be coupled to tuner 106. Further, tuner 106 is coupled to duplexer 110, which includes an output coupled to an input of receiver 120. An output of receiver 120 may be coupled to an input of modem 134 via ADC 126 and sample server 130. Moreover, an output of modem 134 may be coupled to an input of transmitter 118 via DAC 124. An output of transmitter 118 may be coupled to an input of power amplifier 112, which further includes an output coupled to an input of duplexer 110.

Figure 2:
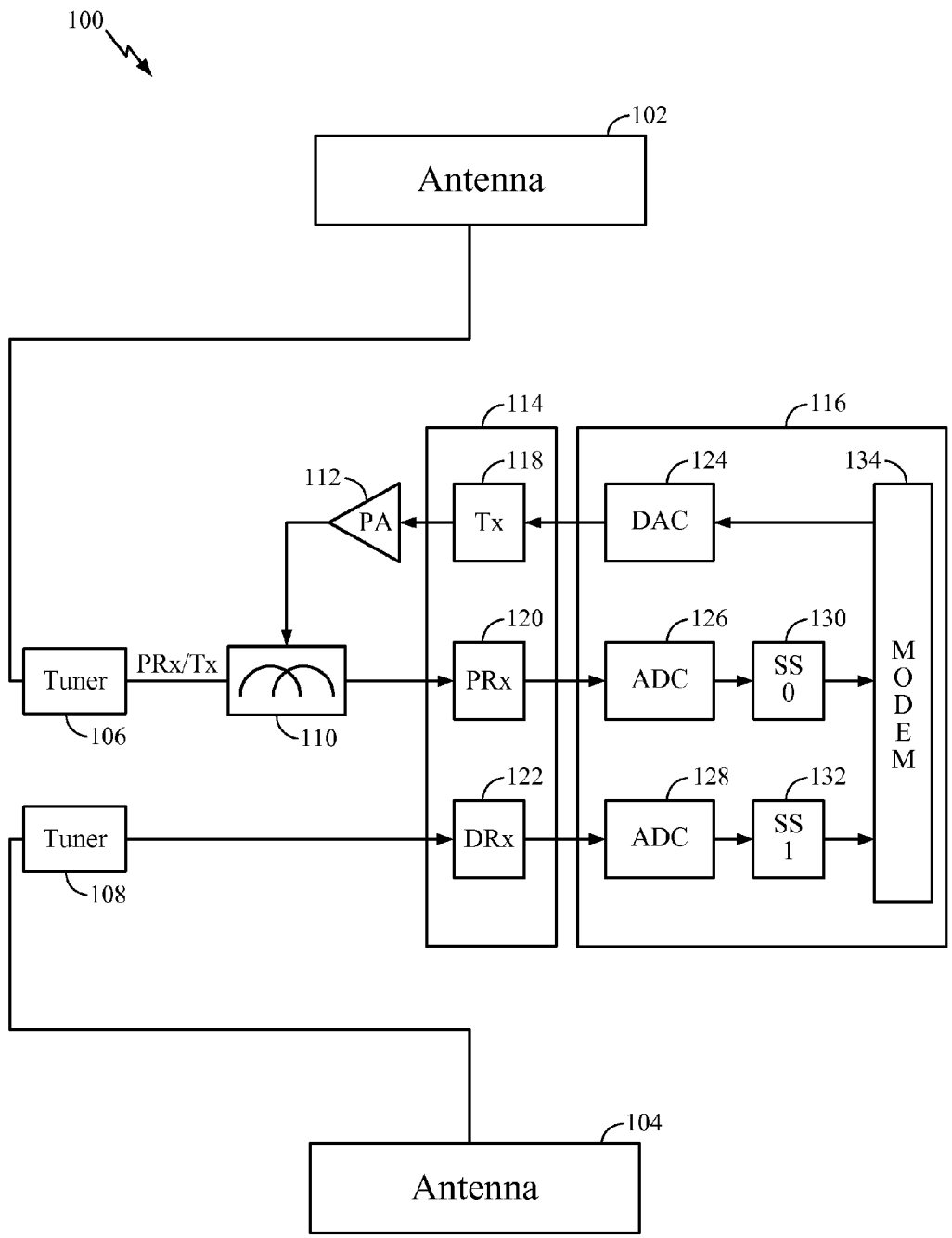
FIG. 2 illustrates a device including a plurality of antenna tuners coupled to a transceiver, in accordance with an exemplary embodiment of the present invention.

It is noted that device 100 may include an additional tuner coupled to a diversity receive path of module 114 and module 116. For example, FIG. 2 illustrates a device 100 including antennas 102 and 104, antenna tuners 106 and 108, duplexer 110, and power amplifier 112. Further, device 200 includes module 114 and module 116. As illustrated in FIG. 2, module 114 may also include a receiver 122. In this example, receiver 120 may comprise a primary receiver ("PRx") and receiver 122 may comprise a diversity receiver ("DRx"). Further, module 116 may also include a ADC 128 and a sample server 132 coupled between receiver 122 and modem 134. In addition, antenna 104, which may comprise a diversity antenna, may be coupled to tuner 108. Further, an output of tuner 108 is coupled to an input of receiver 122, and an output of receiver 122 is coupled to an input of modem 134 via ADC 128 and sampler server 132.

In accordance with various exemplary embodiments, tuner 106 may be tuned based on one or more operating conditions of device 100. More specifically, for example, tuner 106 may be tuned for a receive frequency if device 100 is operating in a "receive only" mode. Otherwise, tuner 106 may be tuned to a transmit frequency. Moreover, in the embodiment illustrated in FIG. 2, tuner 108 may be tuned to a receive frequency. It is noted that tuners 106 and 108 may be tuned via one or more analog signals, digital signals, or a combination thereof. More specifically, tuners 106 and 108 may comprise digitally controlled tuners, analog controlled tuners, or both. By way of example only, a tuner, as described herein, may be controlled via a varactor to change a capacitance load as needed or via switching between two circuits (i.e., one that is designed for transmit frequency and one that is designed for receive frequency). It is noted that the "receive only" mode may be referred to herein a "receive mode" and any other mode that is not a "receive only" mode may be referred to as a "transmit and receive mode" or a "transmit mode."

Figure 3:
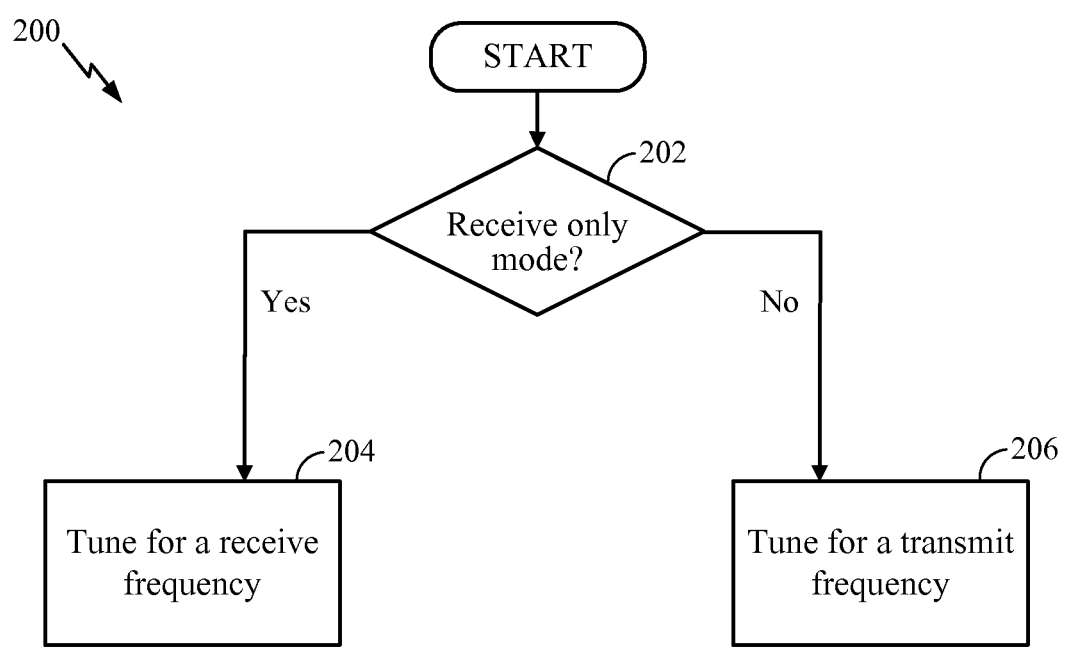
FIG. 3 is a flowchart illustrating a contemplated operation of a device including an antenna tuner, according to an exemplary embodiment of the present invention.

With reference to a flowchart 200 illustrated in FIG. 3, a contemplated operation of device 100 will now be described. At step 202, a determination may be made as to whether a device (e.g., device 100) is operating in a receive mode (i.e., "receive only") mode or a transmit and receive mode. If device 100 is operating in a receive mode, tuner 106 may be tuned for a receive frequency, as indicated at step 204. If device 100 is not operating in a receive mode (e.g., device 100 is operating in a transmit and receive mode), tuner 106 may be tuned for a transmit frequency, as indicated by step 206.

Figure 4:
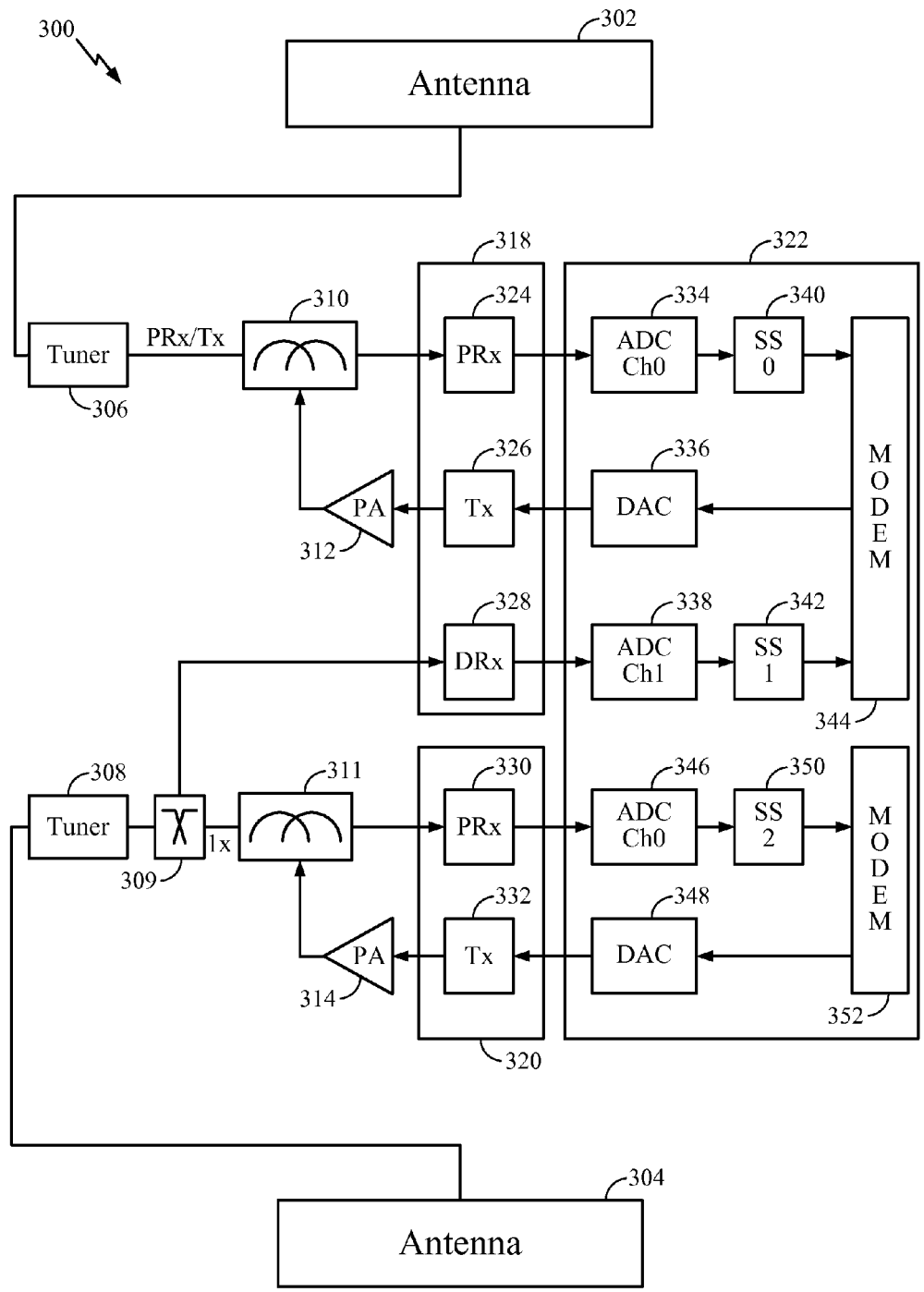
FIG. 4 illustrates another device including a plurality of antenna tuners, according to an exemplary embodiment of the present invention.

FIG. 4 depicts another device 300, in accordance with an exemplary embodiment of the present invention. As will be appreciated by a person having ordinary skill in the art, device 300 may comprise a multiple radio device. Device 300 includes antennas 302 and 304, antenna tuners 306 and 308, filter 309, duplexer 310, duplexer 311, power amplifier 312 and power amplifier 314. Each of antennas tuners 306 and 308 may also be referred to herein as a "matching device" or, more specifically, a "matching circuit." For example only, filter 309 may comprise a bypass filter.

Further, device 300 includes a module 318, a module 320, and a module 322. By way of example, each of module 318 and module 320 may include an analog module, a transceiver module, or a combination thereof. In addition, module 322 may comprise, for example, a MDM. As illustrated in FIG. 4, module 318 includes a receiver 324, a transmitter 326, and a receiver 328. By way of example only, receiver 324 may comprise a primary receiver ("PRx") and receiver 328 may comprise a diversity receiver ("DRx"). Further, module 320 includes a receiver 330 and a transmitter 332. As a non-limiting example, receiver 330 may comprise a primary receiver.

Module 322 may include ADCs 334, 338, and 346, sample servers 340, 342, and 350, and digital-to-analog converters (DACs) 336 and 348. Module 322 may also include a modem 344, which may comprise, for example, an LTE modem, and a modem 352, which may comprise, for example, a CDMA 2000 "1×" modem.

As depicted in FIG. 4, antenna 302, which may comprise a primary antenna, may be coupled to tuner 306. Further, tuner 306 is coupled to duplexer 310, which includes an output coupled to an input of receiver 324. An output of receiver 324 may be coupled to an input of modem 344 via ADC 334 and sample server 340. Moreover, an output of modem 344 may be coupled to an input of transmitter 326 via DAC 336. An output of transmitter 326 may be coupled to an input of power amplifier 312, which further includes an output coupled to an input of duplexer 310, which also includes an output coupled to tuner 306.

In addition, antenna 304, which may comprise a diversity antenna, may be coupled to tuner 308. An output of tuner 308 is coupled to input of filter 309, and an output of filter 309 is coupled to an input of duplexer 311. Furthermore, an output of duplexer 311 may be coupled to an input of receiver 330, which may be further coupled to modem 352 via ADC 346 and sample server 350. An output of modem 352 may be coupled to an input of transmitter 332 via DAC 348. An output of transmitter 332 may be coupled to an input of power amplifier 314, which further includes an output coupled to duplexer 311. An output of duplexer 311 may be coupled to an input of filter 309, which includes an output coupled to tuner 308. Moreover, another output of filter 309 may be coupled to receiver 328 of module 318. Receiver 328 is further coupled to modem 344 via ADC 338 and sample server 342.

In accordance with various exemplary embodiments, tuner 306 may be tuned based on one or more operating conditions of device 300. More specifically, for example, if modem 352 is "ON" and is operating in a receive mode, tuner 308 may be tuned for a receive frequency according to a communication standard of modem 352. If modem 352 is "ON" and is operating in a transmit and receive mode, tuner 308 may be tuned for a transmit frequency according to a communication standard of modem 352. If modem 352 is "OFF," tuner 308 may be tuned for a receive frequency according to a communication standard of modem 344. It is noted that tuners 306 and 308 may be tuned via one or more analog signals, digital signals, or a combination thereof. More specifically, tuners 306 and 308 may comprise digitally controlled tuners, analog controlled tuners, or both. As noted above, a tuner, as described herein, may be controlled via a varactor to change a capacitance load as needed or via switching between two circuits (i.e., one that is designed for transmit frequency and one that is designed for receive frequency).

Figure 5:
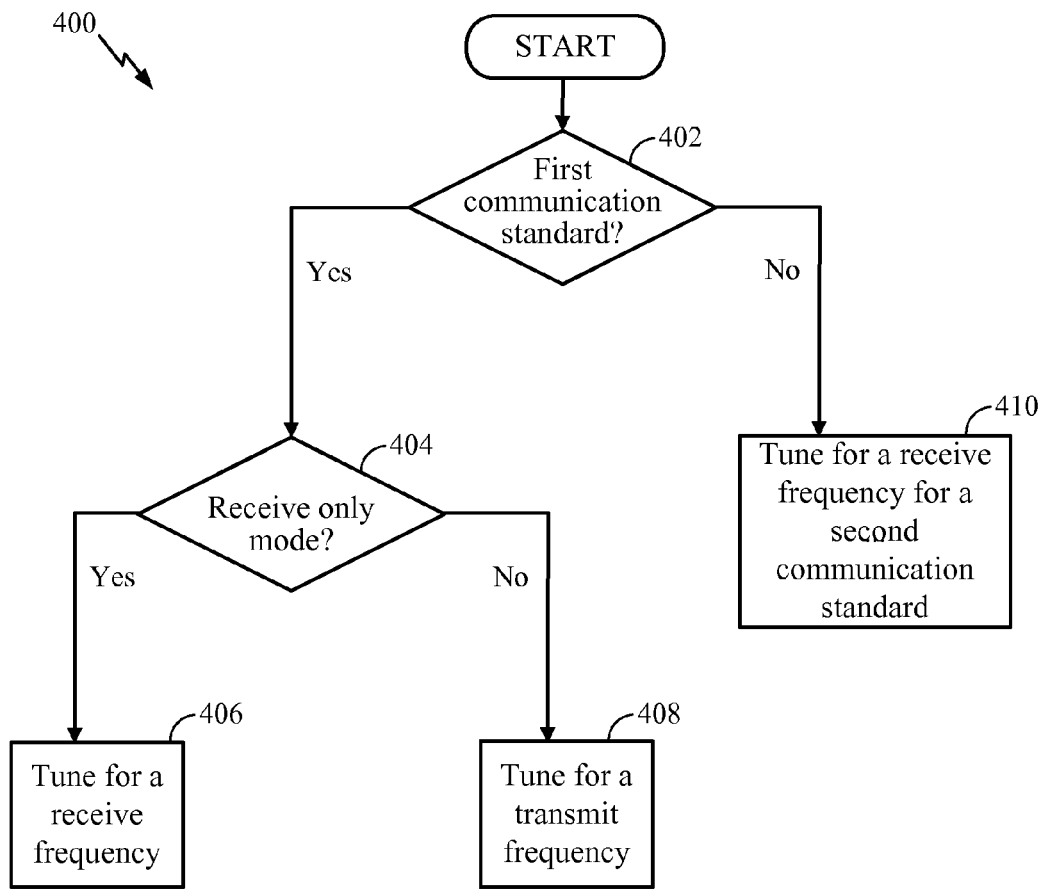
FIG. 5 is another flowchart illustrating a contemplated operation of a device including a plurality of antenna tuners, according to an exemplary embodiment of the present invention.

With reference to a flowchart 400 illustrated in FIG. 5, a contemplated operation of device 300 will now be described. It is noted that the operation described with reference to FIG. 5 comprises a multi-radio scenario. At step 402, it may be determined whether a device (e.g., device 300) is operating in a first communication standard. More specifically, for example, at step 402, a determination may be made as to whether device 300 is operating in a 1× communication standard. If device 300 is operating in the first communication standard, it may be determined, at step 404, whether device 100 is operating in a receive mode. If device 300 is operating in a receive mode, tuner 306 may be tuned for a receive frequency, as indicated at step 406. If, at step 404, it is determined that device 300 is operating in a transmit and receive mode, tuner 306 may be tuned for a transmit frequency, as indicated by step 408. Returning to step 402, if it is determined that device 300 is not operating in the first communication standard, tuner 306 may be tuned for a receive frequency and according to a second, different communication standard, as indicated by step 410. More specifically, for example, at step 410, tuner 306 may be tuned for a receive frequency and according to an LTE communication standard.

Figure 6:
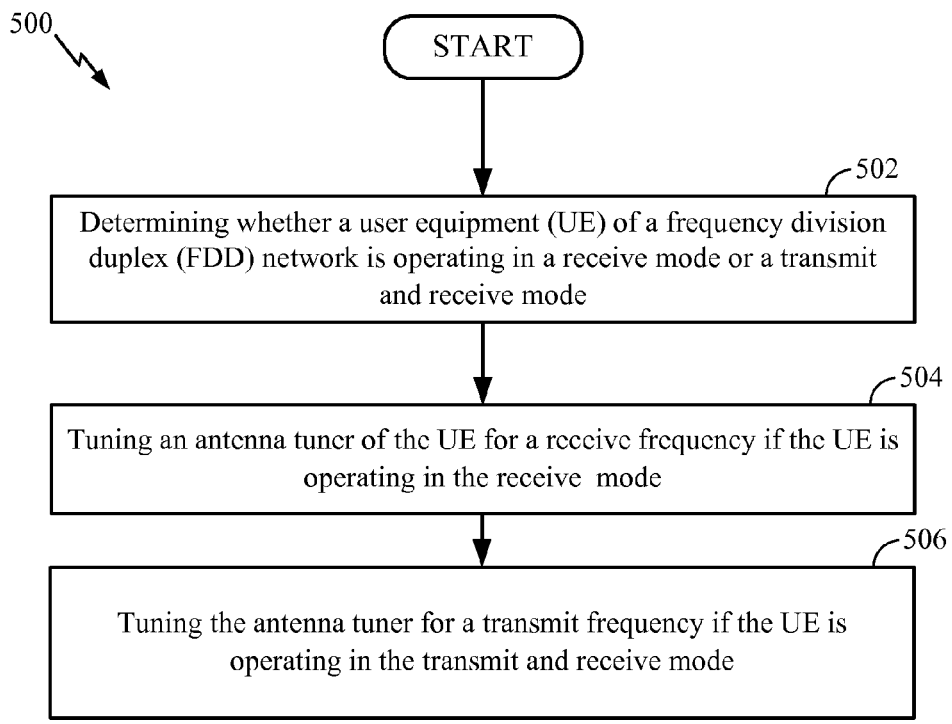
FIG. 6 is flowchart depicting a method, in accordance with an exemplary embodiment of the present invention.

FIG. 6 is a flowchart illustrating a method 500, in accordance with one or more exemplary embodiments. Method 500 may include determining whether a transceiver of a frequency division duplex (FDD) network is operating in a receive mode or a transmit and receive mode (depicted by numeral 502). Method 500 may also include tuning an antenna tuner of the transceiver for a receive frequency if the transceiver is operating in the receive mode (depicted by numeral 504). Further, method 500 may include tuning the antenna tuner for a transmit frequency if the transceiver is operating in the transmit and receive mode (depicted by numeral 506).

Figure 7:
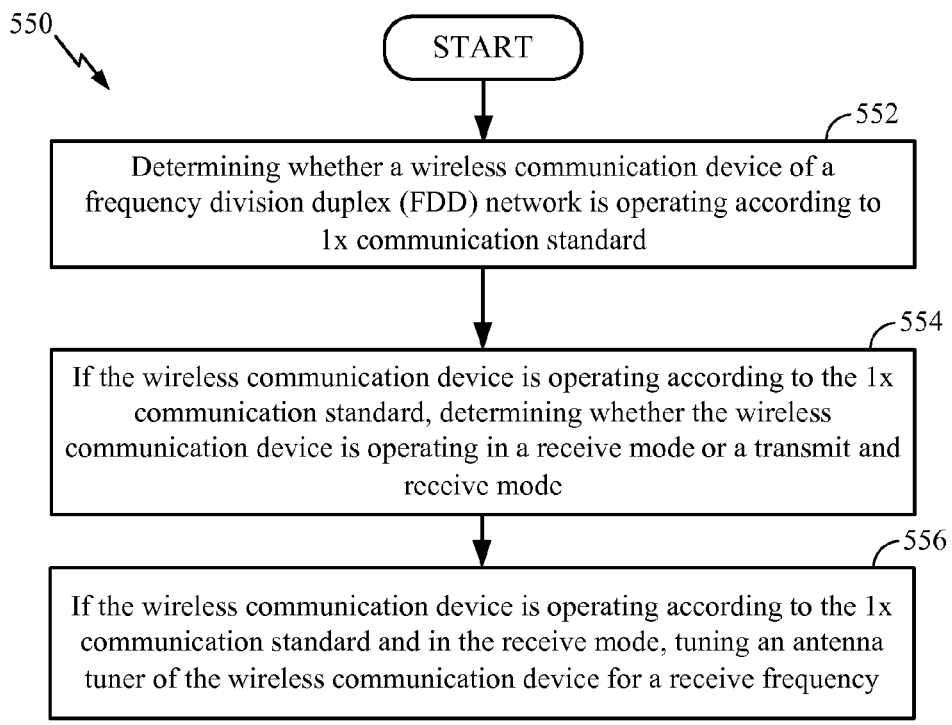
FIG. 7 is flowchart depicting another method, in accordance with an exemplary embodiment of the present invention.

FIG. 7 is a flowchart illustrating another method 550, in accordance with one or more exemplary embodiments. Method 550 may include determining whether a wireless communication device of a frequency division duplex (FDD) network is operating according to 1× communication standard (depicted by numeral 552). Method 550 may also include, if the wireless communication device is operating according to the 1× communication standard, determining whether the wireless communication device is operating in a receive mode or a transmit and receive mode (depicted by numeral 554). If the wireless communication device is not operating according to the 1× communication standard, method 550 may include tuning an antenna tuner of the wireless communication device for a receive frequency according to a LTE communication standard. Further, method 550 may include, if the wireless communication device is operating according to the 1× communication standard and in the receive mode, tuning an antenna tuner of the wireless communication device for a receive frequency (depicted by numeral 556). Otherwise, if the wireless communication device is operating according to the 1× communication standard and in the transmit and receive mode, method 550 may include tuning an antenna tuner of the wireless communication device for a transmit frequency.

With reference again to FIGS. 1 and 2, another exemplary embodiment of the present invention will now be described. In a transmit and receive mode, performance of a receiver (e.g., receiver 120) and performance of a transmitter (e.g., transmitter 118) may be analyzed to determine whether tuner 106 should be tuned for a transmit frequency or a receive frequency. For example, if transmitter 118 is transmitting at maximum transmit power limit (MTPL), which is quite often an indication of stressed Tx/uplink, and receiver 120 has sufficient margin with respect to a sensitivity level, tuner 106 can be tuned to favor transmitter 118. On the other hand, if transmitter 118 is transmitting a few dB down from MTPL but receiver 120 is at the sensitivity level, tuner 106 can be tuned to favor receiver 120. A difference between FIGS. 1 and 2 in this regard is that modem 134 can receive at a lower level with diversity receiver 122, so tuning is a bit different. The tuner configuration (or how to tune the tuner), can be from a look-up table, which stores calibration results in terms of receive/transmit performance for each configuration. Thus, by comparing calibration results associated with a current tuner configuration with those of another configuration, a new configuration can be determined as to whether receive is favored and transmit is sacrificed, or transmit is favored and receive is sacrificed.

Figure 8:
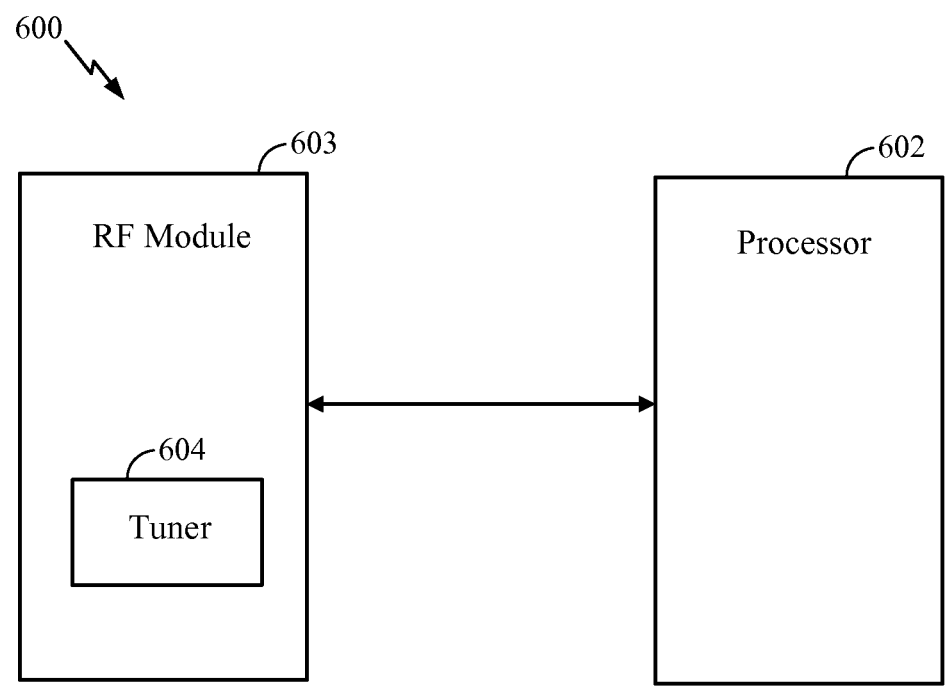
FIG. 8 is a device including a radio-frequency (RF) module and a processor, according to an exemplary embodiment of the present invention.

FIG. 8 illustrates a device 600 including a processor 602 coupled to an RF module 603 having at least one antenna tuner 604, in accordance with an exemplary embodiment of the present invention. Processor 602, which may comprise, or may have access to, memory (i.e., computer-readable media storage for storing instructions that when executed by a processor cause the processor to perform instructions), may be configured for conveying one or more control signals to antenna tuner 604 based on one or more operating conditions of RF module 603. Upon receipt of the one or more controls signals, antenna tuner 604 may be tuned accordingly. As will be appreciated by a person having ordinary skill in the art, antenna tuner 604 may comprise antenna tuner 106 (see FIGS. 1 and 2), antenna tuner 108 (see FIG. 2), antenna tuner 306 (see FIG. 4), antenna tuner 308 (see FIG. 4), or any combination thereof.

Figure 9:
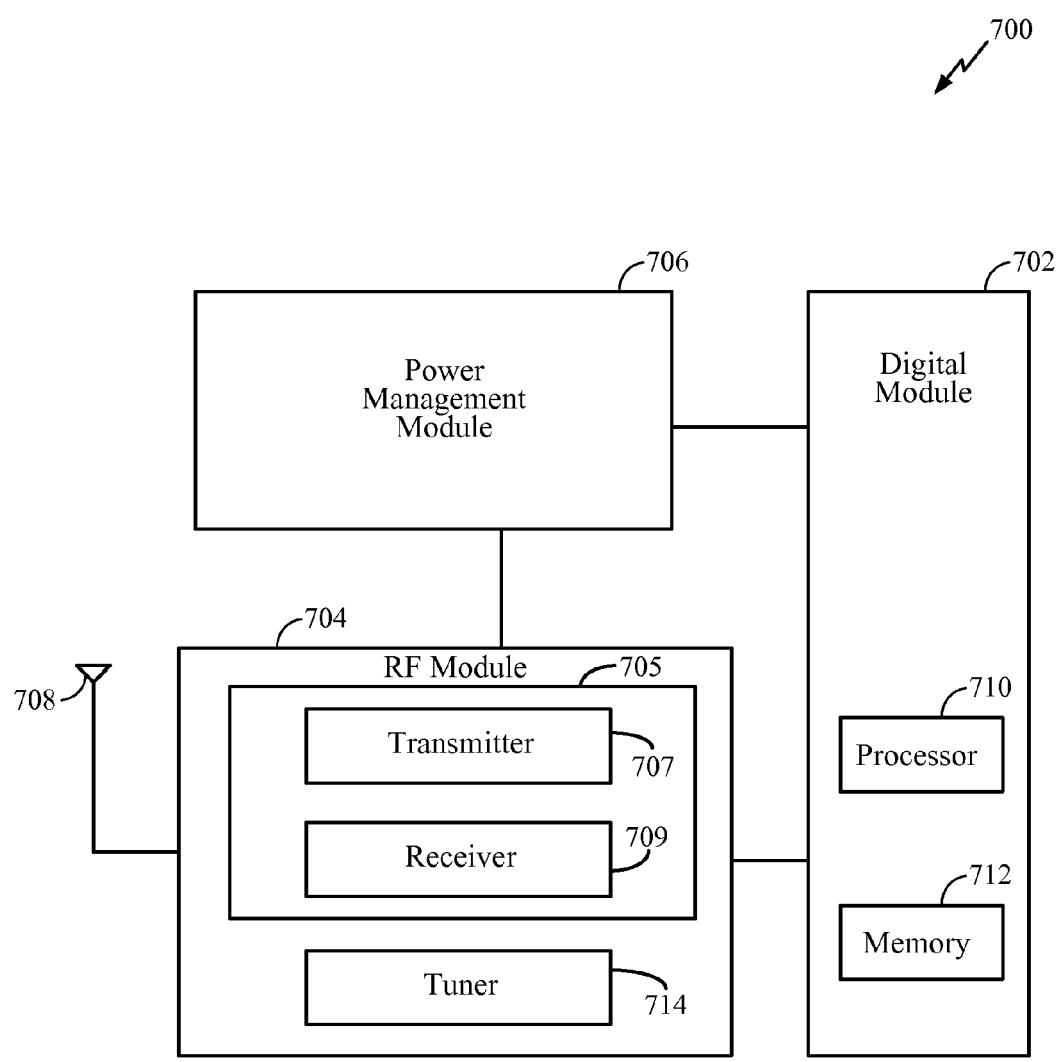
FIG. 9 is a device including an RF module, a digital module, and a power management module, in accordance with an exemplary embodiment of the present invention.

FIG. 9 is a block diagram of an electronic device 700, according to an exemplary embodiment of the present invention. According to one example, device 700 may comprise a portable electronic device, such as a mobile telephone. Device 700 may include various modules, such as a digital module 702, an RF module 704, and a power management module 706. Digital module 702 may comprise memory and one or more processors 710 and memory 712. RF module 704, which may comprise RF circuitry, may include a transceiver 705 including a transmitter 707 and a receiver 709 and may be configured for bi-directional wireless communication via an antenna 708. In general, wireless communication device 700 may include any number of transmitters and any number of receivers for any number of communication systems, any number of frequency bands, and any number of antennas. Further, according to an exemplary embodiment of the present invention, RF module 704 may include one or more antenna tuners 714, as described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   a transceiver configured to operate in a frequency division duplex (FDD) network;
   an antenna tuner coupled to the transceiver; and
   a processor configured to selectively tune the antenna tuner to one of a receive frequency and a transmit frequency based on whether the device is operating in a receive mode and whether the device is operating in a first communication standard or a second communication standard, wherein the processor is further configured to:
   determine whether the device is operating in the first communication standard;
   tune the antenna tuner to the receive frequency according to the first communication standard if the device is operating in the receive mode and the first communication standard;
   tune the antenna tuner to the transmit frequency according to the first communication standard if the device is operating in a transmit and receive mode and the first communication standard; and
   tune the antenna tuner to the receive frequency according to the second communication standard if the device is not operating in the first communication standard.

2. The device of claim 1, wherein the transceiver comprises:
   a transmitter coupled between a mobile data modem (MDM) and the antenna tuner;
   a primary receiver coupled between the MDM and the antenna tuner.

3. The device of claim 2, further comprising a second transceiver comprising:
   a diversity receiver coupled between the MDM and the antenna tuner;

a second transmitter coupled between the MDM and a second antenna tuner; and a second primary receiving receiver coupled between the MDM and the second antenna tuner.

4. The device of claim 1, wherein the transceiver comprises:
a transmitter coupled between mobile data modem (MDM) and the antenna tuner;
a primary receiver coupled between the MDM and the antenna tuner; and
a diversity receiver coupled between the MDM and a second antenna tuner.

5. The device of claim 4, further comprising a first antenna coupled to the antenna tuner and a second antenna coupled to the second antenna tuner.

6. The device of claim 1, wherein the antenna tuner is coupled to a transmitter and a receiver of the transceiver.

7. The device of claim 1, wherein the transceiver is coupled to one of a long term evolution (LTE) modem and a code division multiple access modem of mobile data modem (MDM).

8. The device of claim 1, wherein the first communication standard comprises a code division multiple access communication standard.

9. A method, comprising:
determining whether a user equipment (UE) of a frequency division duplex (FDD) network is operating in a receive mode or a transmit and receive mode;
tuning an antenna tuner of the UE to one of a receive frequency and a transmit frequency based on whether the UE is operating in the receive mode and whether the UE is operating in a long-term evolution mode (LTE) communication standard or a code division multiple access communication standard;
determining whether the UE is operating in the LTE communication standard or the code division multiple access communication standard; and
if the UE is not operating in the code division multiple access communication standard, tuning the antenna tuner to the receive frequency according to the LTE communication standard,
wherein tuning the antenna tuner of the UE to the receive frequency if the UE is operating in the receive mode comprises tuning the antenna tuner to the receive frequency according to the code division multiple access communication standard if the UE is operating in the receive mode and the code division multiple access communication standard, and wherein tuning the antenna tuner to the transmit frequency if the UE is operating in the transmit and receive mode comprises tuning the antenna tuner to the transmit frequency according to the code division multiple access communication standard if the UE is operating in the transmit and receive mode and the code division multiple access communication standard.

10. The method of claim 9, wherein tuning the antenna tuner to the transmit frequency if the UE is operating in the transmit and receive mode comprises tuning the antenna tuner to the transmit frequency and the code division multiple access communication standard if the UE is operating in the transmit and receive mode and the code division multiple access communication standard.

11. A device, comprising:
a transceiver including a receiver and a transmitter and configured to operate in a frequency division duplex (FDD) network;
an antenna tuner coupled to the transceiver; and
a processor configured to tune the antenna tuner to a receive frequency if the transmitter is transmitting at a maximum transmit power limit and the receiver has sufficient margin with respect to a sensitivity level, and configured to tune the antenna tuner to a transmit frequency if the transmitter is transmitting at less than a maximum transmit power limit and the receiver lacks sufficient margin with respect to the sensitivity level.

12. A device, comprising:
a transceiver configured to operate in a frequency division duplex (FDD) network;
an antenna tuner coupled to the transceiver; and
a processor configured to tune the antenna tuner to a receive frequency if the transmitter is transmitting at a maximum transmit power limit and the receiver has sufficient margin with respect to a sensitivity level, and configured to tune the antenna tuner to a transmit frequency if the transmitter is transmitting at less than a maximum transmit power limit and the receiver lacks sufficient margin with respect to the sensitivity level,
wherein the transceiver comprises:
a transmitter coupled between mobile data modem (MDM) and the antenna tuner;
a primary receiver coupled between the MDM and the antenna tuner; and
a diversity receiver coupled between the MDM and a second antenna tuner.

* * * * *